(12) United States Patent
Christ

(10) Patent No.: US 12,662,208 B2
(45) Date of Patent: Jun. 23, 2026

(54) PINLESS TILT DECK TRAILER LOCKING MECHANISM

(71) Applicant: REELSTRONG LLC, Manheim, PA (US)

(72) Inventor: Brandon Christ, Millersville, PA (US)

(73) Assignee: Reelstrong LLC, Manheim, PA (US)

( * ) Notice: Subject to any disclaimer, the term of this patent is extended or adjusted under 35 U.S.C. 154(b) by 58 days.

(21) Appl. No.: 19/013,616

(22) Filed: Jan. 8, 2025

(65) Prior Publication Data

US 2025/0222999 A1 Jul. 10, 2025

Related U.S. Application Data

(60) Provisional application No. 63/619,027, filed on Jan. 9, 2024.

(51) Int. Cl.
| | |
|---|---|
| *B62D 63/08* | (2006.01) |
| *B60P 1/06* | (2006.01) |
| *B60P 1/24* | (2006.01) |
| *B60P 1/28* | (2006.01) |
| *B60P 1/43* | (2006.01) |
| *B60P 1/44* | (2006.01) |
| (Continued) | |

(52) U.S. Cl.
CPC ................ *B62D 63/08* (2013.01); *B60P 1/06* (2013.01); *B60P 1/24* (2013.01); *B60P 1/283* (2013.01); *B60P 1/433* (2013.01); *B60P 1/4407* (2013.01); *B60P 1/4492* (2013.01); *B60P 3/07* (2013.01); *B62D 21/20* (2013.01); *B60Y 2200/147* (2013.01)

(58) Field of Classification Search
CPC ........ B62D 63/06; B62D 63/08; B62D 53/06;
B62D 53/061; B62D 53/062; B62D 21/20; B60P 1/04; B60P 1/06; B60P 1/43; B60P 1/433; B60P 1/24; B60P 1/26; B60P 1/267; B60P 1/273; B60P 1/28; B60P 1/283; B60P 1/30; B60P 1/34; B60P 1/44; B60P 1/4407; B60P 1/4492; B60P 3/00; B60P 3/06; B60P 3/07; B60G 2300/042; B60Y 2200/147; B60Y 2200/148
USPC ..... 280/789, 423.1, 656; 414/480, 482, 483, 414/484, 485
See application file for complete search history.

(56) References Cited

U.S. PATENT DOCUMENTS

| | | | | |
|---|---|---|---|---|
| 5,051,053 A | * | 9/1991 | Groeneweg | B60P 3/07 414/483 |
| 5,490,754 A | * | 2/1996 | Voelzke | B60P 1/433 296/184.1 |

(Continued)

*Primary Examiner* — Keith J Frisby
(74) *Attorney, Agent, or Firm* — McNees Wallace & Nurick

(57) ABSTRACT

A tilting deck trailer including a main frame structure including a first end beam and a second end beam, the first end beam being closest to a vehicle and the second end beam being farthest from the vehicle, the main frame structure configured to remain stationary, a second frame structure including a first end beam and a second end beam, the first end beam of the second frame structure being closest to the vehicle and the second end beam of the second frame structure being farthest from the vehicle, the second frame structure configured to move into an inclined loading position, and a lifting mechanism attached to the main frame structure for moving the second frame structure in an upward direction.

20 Claims, 15 Drawing Sheets

(51) Int. Cl.
    B60P 3/07          (2006.01)
    B62D 21/20        (2006.01)

(56)             References Cited

U.S. PATENT DOCUMENTS

| | | | |
|---|---|---|---|
| 5,667,231 A * | 9/1997 | Dierks | B60P 3/122 |
| | | | 414/475 |
| 6,149,369 A * | 11/2000 | Reed | B60P 1/14 |
| | | | 414/537 |
| 6,964,427 B2 * | 11/2005 | Chumley | B62D 63/061 |
| | | | 296/57.1 |
| 7,658,587 B1 * | 2/2010 | Dierks | B60P 3/066 |
| | | | 296/184.1 |
| 7,963,738 B1 * | 6/2011 | Haulsey | B60P 3/07 |
| | | | 414/480 |
| 10,752,148 B2 * | 8/2020 | Selzer | B60P 1/433 |
| 2006/0083597 A1 * | 4/2006 | Chang | B60P 3/08 |
| | | | 410/24 |
| 2009/0110523 A1 * | 4/2009 | Geoffrion | B60P 3/06 |
| | | | 410/3 |
| 2020/0290495 A1 * | 9/2020 | Behnke | B60P 1/433 |
| 2024/0074577 A1 * | 3/2024 | Thurston | B65D 88/524 |

* cited by examiner

PINLESS TILT DECK TRAILER LOCKING MECHANISM

This application claims priority from, and the benefit of U.S. provisional patent application Ser. No. 63/619,027, filed Jan. 9, 2024, entitled "Pinless Tilt Deck Trailer Locking Mechanism," of which is incorporated herein by reference.

TECHNICAL FIELD

The present disclosure relates generally to a trailer with a tilting deck for a vehicle. More specifically, the present disclosure relates to a pinless, unpowered tilt-deck trailer for a vehicle.

BACKGROUND

There are many types of trailers used today for transporting equipment over-the-road. The equipment is normally loaded onto the trailer from the rearward end thereof. One type is a folding or loading ramp or the like used at the rear end of the trailers to enable the equipment to move onto a deck of the trailer. However, in these types of trailers, the operator must manually attach the loading ramp to the rear end of the trailer using pins or latches, which is cumbersome and time consuming. Not to mention, the injury it may cause to the operator. Another type is a tilt trailer that tilts back and down to aid in loading and unloading equipment from the trailer. In this case, the bed of the trailer is tilted to move the rearward end thereof into close proximity to the ground to enable the equipment to move or to be moved onto the trailer. The tilt movement is generally powered by a motor and/or hydraulics to move the trailer lowered to the ground. This provides additional costs due to the implementation of the motor and associated equipment. Moreover, a problem associated with both the folding ramp and the tilting trailer bed is that the operator must operate a locking mechanism and/or a pin locking system to lock/unlock the trailer. For example, in the folding ramp design, the operator must operate a latch to lock the loading ramps onto the trailer; and in the tilt trailer design, the operator must manually operate a lever locking system and/or a pin locking system to hold the trailer deck in its tilted position, which presents a non-automated system. As such, in both cases, the operator is exposed to potential safety hazards or injuries.

Accordingly, there remains a need to develop a pinless unpowered tilt-deck trailer with autolocking features to secure the trailer in place.

SUMMARY

In an exemplary embodiment, a tilting deck trailer includes a main frame structure including a first end beam and a second end beam, the first end beam being closest to a vehicle and the second end beam being farthest from the vehicle, the main frame structure configured to remain stationary, a second frame structure including a first end beam and a second end beam, the first end beam of the second frame structure being closest to the vehicle and the second end beam of the second frame structure being farthest from the vehicle, the second frame structure configured to move into an inclined loading position, and a lifting mechanism attached to the main frame structure and configured to move the second frame structure in an upward direction, wherein one end of the lifting mechanism is disposed near the first end beam of the main frame structure and another end of the lifting mechanism is disposed near the second end beam of the main frame structure, wherein, in a locked state, the lifting mechanism extends through the second end beam of the main frame structure and the first end beam of the second frame structure, and wherein, in an unlocked state, the lifting mechanism extends through the second end beam of the main frame structure, releasing the second frame structure to move upwards.

In another example embodiment, a trailer includes an elongate stationary deck having a main frame structure, an elongate tilt deck including a second frame structure, the elongate tilt deck being configured to tilt relative to the elongate stationary deck, and a lifting mechanism disposed below and extending in a longitudinal direction of the elongate stationary deck, wherein the lifting mechanism is configured to be in a first position to lock the elongate tilt deck in place and configured to be in a second position to unlock the elongate tilt deck and tilt the elongate tilt deck for loading, and wherein the lifting mechanism is operated by gravity functioning.

In yet another example embodiment, a method of using the trailer comprising the steps of pushing a handle towards a rear-end of the trailer, moving a locking bar towards the main frame structure, unlocking a locking pole that was inserted through the main frame structure and the second frame structure, raising the second frame structure, lowering the second frame structure when a load is applied, pushing back the locking pole to allow the second frame structure to be lowered, and relocking the locking pole, via a spring, when the second frame structure is completely lowered.

Other features and advantages of the present invention will be apparent from the following more detailed description of the preferred embodiment, taken in conjunction with the accompanying drawings which illustrate, by way of example, the principles of the invention.

Figure 1:
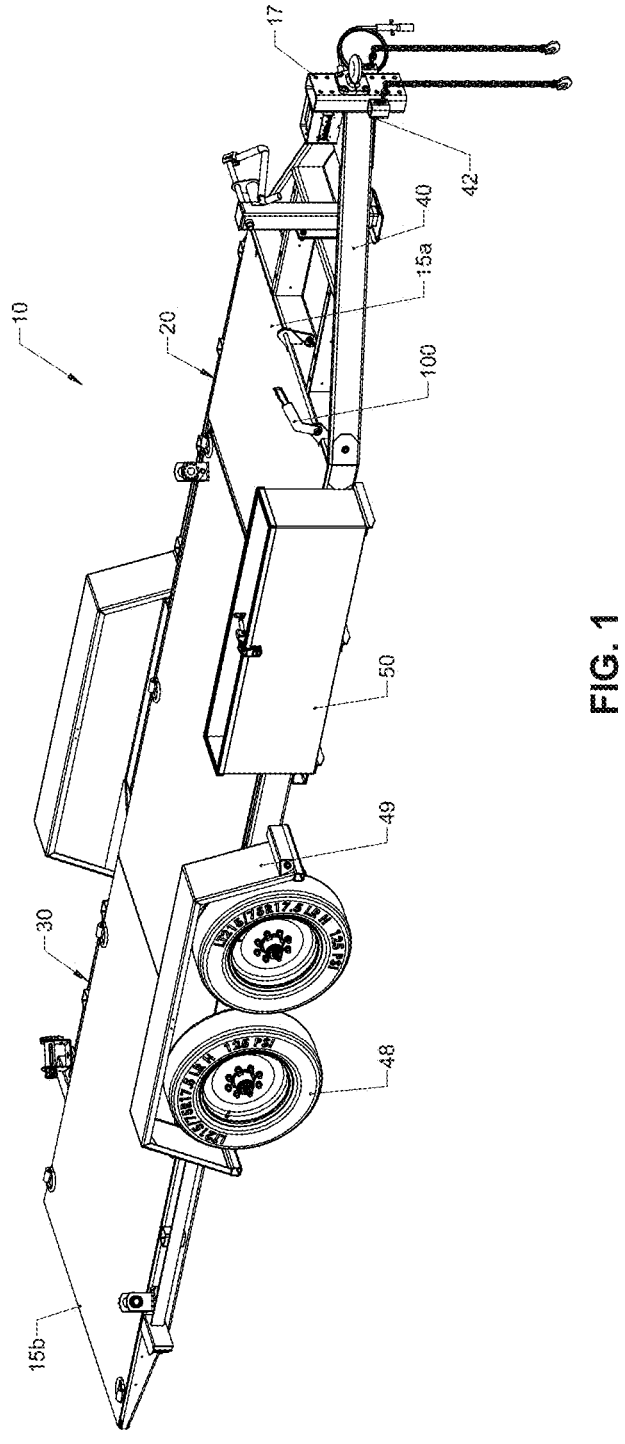
FIG. 1 is a perspective view of a tilt deck trailer in its initial state, according to an example embodiment.

It should be noted that these Figures are intended to illustrate the general characteristics of methods, structure and/or materials utilized in certain example embodiments and to supplement the written description provided below.

These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

The present disclosure discloses a new pinless trailer design to automatically lock the deck on an unpowered tilt-deck trailer. The improved pinless trailer design is operated by a single person with a gravity functioning tilt deck trailer. In one implementation, once unlocked, the pinless trailer will stay unlocked and allow the operator to manually tilt the deck since the tilting movement is not operated by any equipment, i.e., motor, hydraulics. As such, the pinless trailer design will automatically reset and be ready to automatically lock when the tilt deck returns to its initial position without any assistance from the operator.

The trailer of the present disclosure is designed to be pulled by a vehicle, i.e., truck, having a coupling or coupler at the forward end thereof and can rest on a hitch ball that is secured by a latch lever.

As used in this description, the term "proximal" refers to the end, portion, or side of a structure that is generally nearer to or generally facing the point of contact between the trailer and the vehicle. Likewise, the term "distal" refers to the end, portion, or side of a structure that is generally farther from or facing away from the point of contact between the trailer and the vehicle, as compared with that structure's proximal end, portion, or side.

The terms "attached" "joined" and "connected" refer to direct attachment between structures such as by welding, riveting, or bolting, indirect attachment, such as through intervening structures, or structures that are integral with one another. Relative terms such as "horizontal," "vertical," "up," "down," "top," and "bottom" refer to the orientation of the present disclosure as then described or shown in the drawing figure under discussion. These relative terms do not necessarily require a particular orientation.

Figure 2:
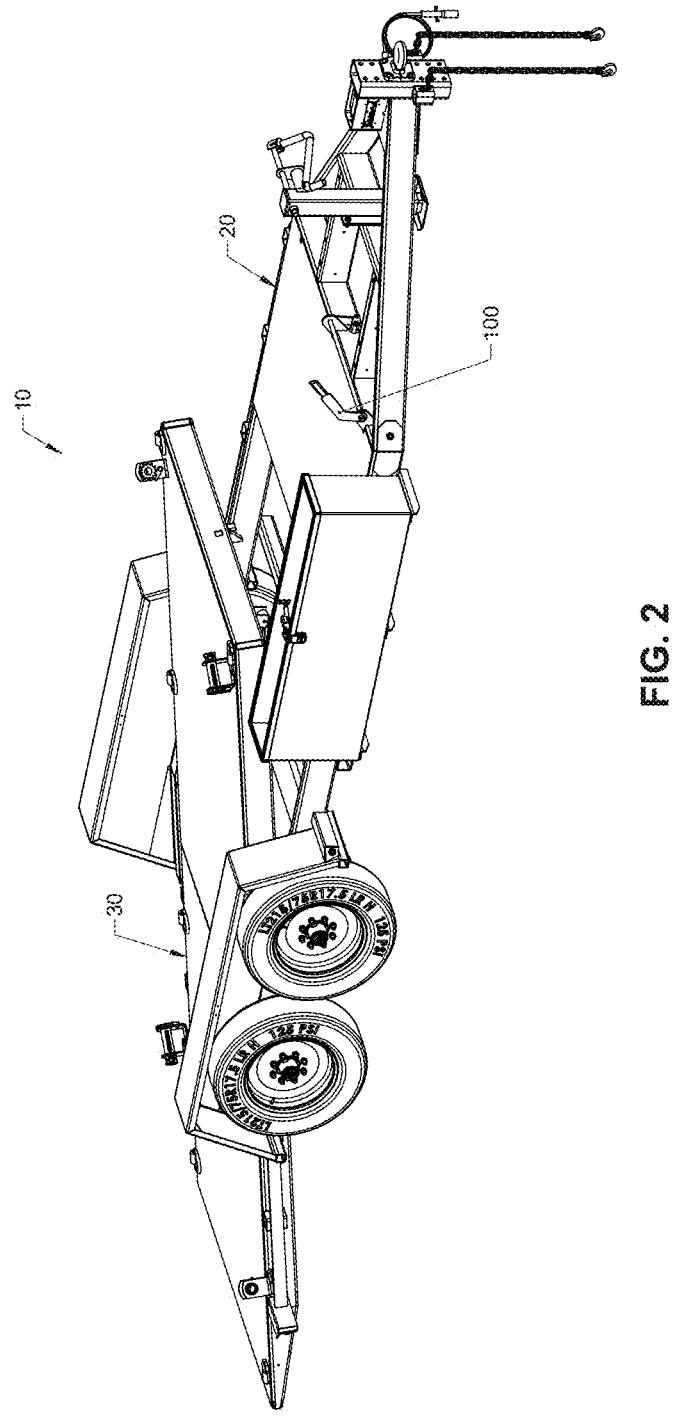
FIG. 2 is a perspective view of a tilt deck trailer in its tilted state, according to an example embodiment.

Referring now to the figures, there is illustrated example embodiments of a tilt deck trailer constructed according to the principles of the present disclosure. As shown in FIGS. 1 and 2, a tilt deck trailer 10 is designed to be pulled by a vehicle, i.e., truck, having a coupling or coupler 17 at a forward end thereof. The tilt deck trailer 10 is generally rectangular shaped having a front-end portion 15a (closest to the vehicle) and a rear-end portion 15b (farthest from the vehicle). The tilt deck trailer 10 includes a main frame structure 20 and a second frame structure 30 interconnected and inter-related with the main frame structure 20. The main frame structure 20 is designed to be stationary while the second frame structure 30 is designed to be tiltable, i.e., move up-and-down at an angle. To describe differently, the second frame structure 30 pivots about a point to tilt the second frame structure 30 at an incline. As shown in FIG. 2, when the second frame structure 30 is moved in a rearward direction relative to the main frame structure 20, it tilts into an inclined position for loading an equipment. In one implementation, an angle of the second frame structure 30, from the horizontal, is approximately 7°-10° in the full inclined loading position. Conversely, when the second frame structure 30 is moved in a forward direction relative to the main frame structure 20, it tilts back into a horizontal load-carrying position, i.e., flat or planar.

The main frame structure 20 has a frame member 22 of a quadrilateral shape, i.e., four side members. The frame member 22 includes a pair of side beams 23, 24 parallel to each other that extend in a longitudinal direction, i.e., front end portion 15a to rear end portion 15b, and a pair of end beams 25, 26 parallel to each other that extend between the pair of side beams 23, 24, thus forming a closed generally rectangular configuration. Each beam 23, 24, 25, 26 is an elongated structure and can be rectangular, rod-shaped, hollow, or solid. The beams 23, 24, 25, 26 can be constructed from aluminum, steel, fiberglass, plastic, or any material that is rigid enough to hold its shape, and strong enough to support a portion of the weight of a loaded trailer. Similarly, the second frame structure 30 has a frame member 32 of a quadrilateral shape. In comparison to the main frame structure 20, the second frame structure 30 is longer in the longitudinal direction with respect to the main frame structure 20. The second frame member 32 includes a pair of side beams 33, 34 parallel to each other that extend in a longitudinal direction, i.e., front end portion 15a to rear end portion 15b, and a pair of end beams 35, 36 parallel to each other that extend between the pair of side beams 33, 34, thus forming a closed generally rectangular configuration. Each beam 33, 34, 35, 36 is an elongated structure and can be rectangular, rod-shaped, hollow, or solid. The beams 33, 34, 35, 36 can be constructed from aluminum, steel, fiberglass, plastic, or any material that is rigid enough to hold its shape, and strong enough to support a portion of the weight of a loaded trailer.

Figure 3:
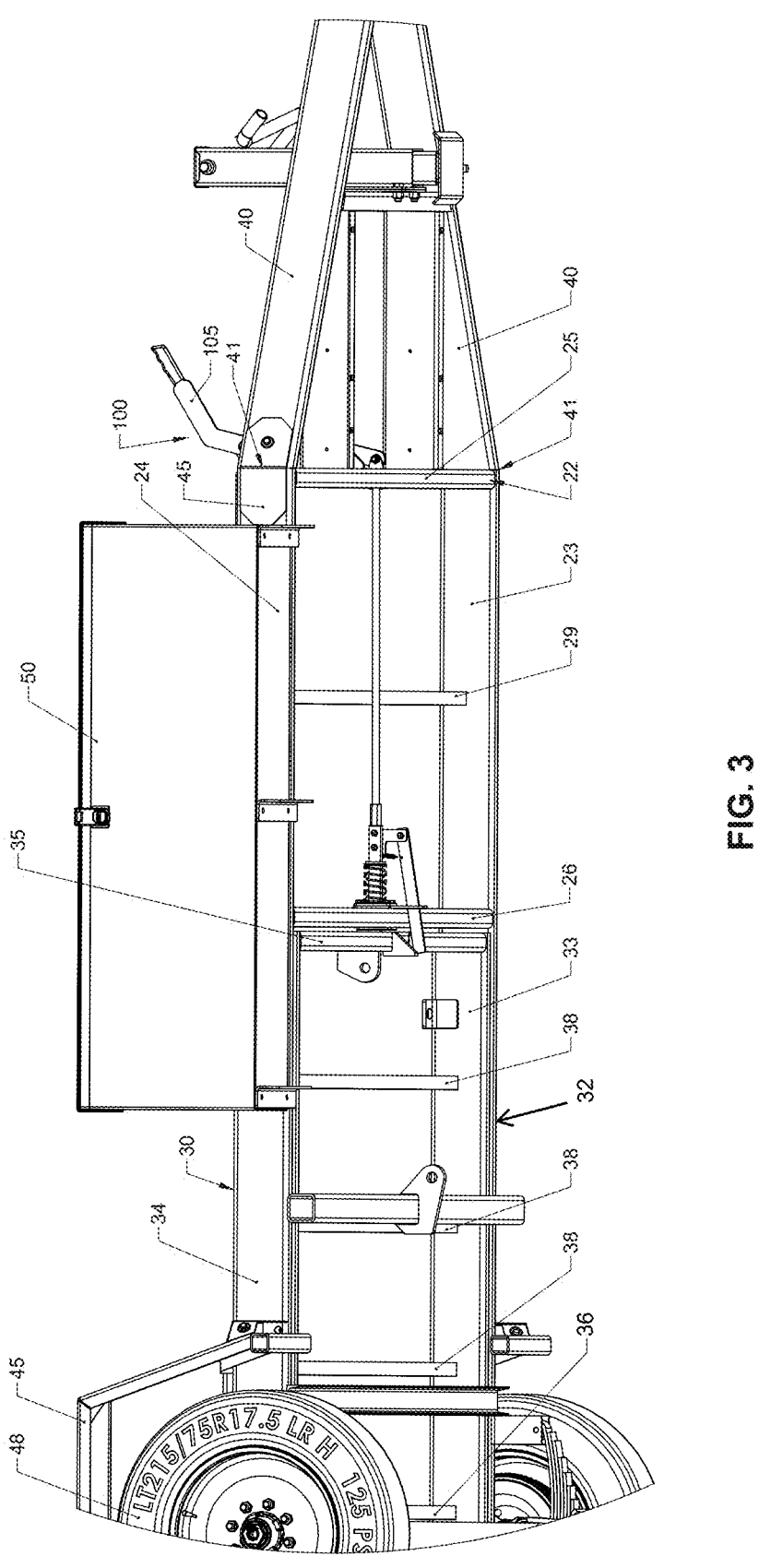
FIG. 3 is a perspective bottom view of a tilt deck trailer, according to an example embodiment.

As shown in FIG. 3, extending in the same direction as the end beams 25, 26, a crossbeam 29 is attached to a portion of the side beams 23, 24 located generally in a mid-portion of the side beams 23, 24. In other words, the crossbeam 29 extends generally perpendicular to the side beams 23, 24, and forms a portion of the main frame structure 20. The crossbeam 29 is an elongate structure similar to the side beams 23, 24 and/or the end beams 25, 26. The crossbeam 29 can be the same size, shape, and material as each other, and/or the side beams 23, 24 and/or the end beams 25, 26, or they can differ. In one implementation, the crossbeam 29 is relatively smaller (i.e., reduced height) than the end beams 25, 26 in order to provide a clearance or space for a lifting mechanism 100 underneath the trailer 10, as will be discussed further in detail. The crossbeam 29 can be constructed from aluminum, steel, fiberglass, plastic, or any material that is rigid enough to hold its shape, and strong enough to support a portion of the weight of a loaded trailer. The crossbeam 29 provides additional support and structural strength of the entire main frame structure 20. While the example embodiment described herein illustrates only one crossbeam 29, there may be more than one crossbeam constructed in the main frame structure 20. Similarly, the second frame structure 30 includes a plurality of crossbeams 38 extending in the same direction as the end beams 35, 36 or attached to a portion of the side beams 33, 34 located generally in a mid-portion of the side beams 33, 34. The crossbeams 38 are an elongate structure similar to the side beams 33, 34 and/or the end beams 35, 36. The crossbeams 38 can be the same size, shape, and material as each other, and/or the side beams 33, 34 and/or the end beams 35, 36, or they can differ. In one implementation, the crossbeams 38 are relatively smaller (i.e., reduced height) than the end beams 35, 36. The crossbeams 38 can be constructed from aluminum, steel, fiberglass, plastic, or any material that is rigid enough to hold its shape, and strong enough to support a portion of the weight of a loaded trailer. The crossbeams 38 provides additional support and structural strength of the entire second frame structure 30.

Attached at the end beam 25, are two beams 40 having a distal end 41 and a proximal end 42. The tow beams 40 are elongate structures similar to the side beams 23, 24 and/or the end beams 25, 26. The tow beams 40 can be a similar size, shape, and material as the side beams 23, 24 and/or the end beams 25, 26, or it can differ. The tow beams 40 can be constructed from aluminum, steel, fiberglass, plastic, or any material that is rigid enough to hold its shape, and strong enough to tow the weight of the trailer and a loaded trailer. Each of the proximal ends 41 of the tow beams 40 is attached to one of each of the end beam 25 or the side beams 23, 24. In some implementations, a reinforcement plate 45 can be attached to an outer surface of the side beams 23, 24 and the respective tow beams 40 for structural strength (FIG. 3). The distal ends 42 of each of the two beams 40 converge together, forming a triangular shaped structure, and are attached to the coupling 17. The coupling 17 is a conventional coupling used for joining trailers to the vehicle for transport.

In some implementations, the trailer 10 has two or more wheels 48 attached to each side beams 33, 34 surrounded by a fender 49 to prevent debris from being thrown up by the rotating wheels 48. The wheels 48 can have tires and can be any kind of wheel known in the art that is appropriate for trailers, or transportation of heavy equipment, on-or off-road. Further, a storage compartment 50 is provided on the trailer 10 for storing equipment, tools, gears, and the like.

Referring now to the lifting and locking features of the present disclosure, FIGS. 4A-4G illustrate the operation of the automated lifting mechanism 100, according to an example embodiment. The lifting mechanism 100 is configured to lift the second frame structure 30 and set the second frame structure 30 in a lowered loading position, as illustrated in FIG. 2. The lifting mechanism 100 is designed to be operated by a single person with a gravity functioning locking feature. In other words, once unlocked, the lifting mechanism 100 is configured to return the tilt deck, i.e., the second frame structure 30, to its initial position and automatically lock the trailer deck without any powered device (s). As such, the present trailer 10 is more efficient, easy to use, safer to operate, and less expensive due to lack of powered machinery.

Figure 7:
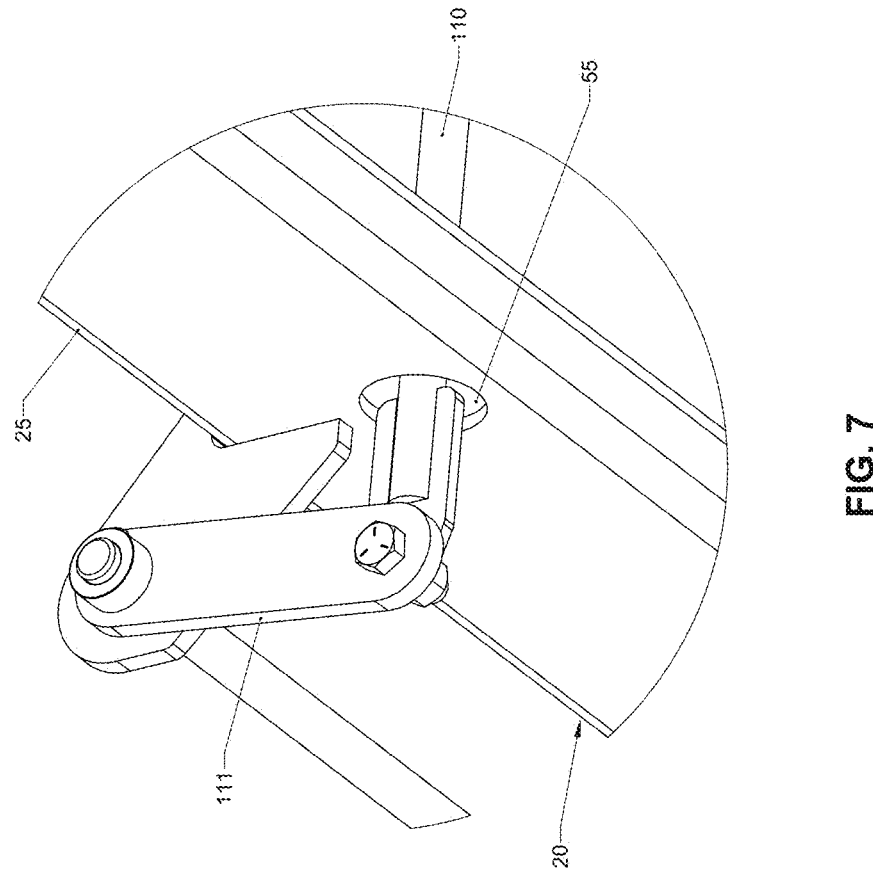
FIG. 7 is a perspective view of a control bar near a handle side, according to an example embodiment.

The lifting mechanism 100 includes a handle 105 attached to a control bar 110 that extends in the longitudinal direction of the main frame structure 20, and a lock bar 120 for locking/unlocking the lifting mechanism 100. One end of the control bar 110 is connected to the handle 105, via a connection bar 111 (FIG. 9 FIG. 7), extending through the end beam 25 via hole 55 formed thereof, and the other end of the control bar 110 is connected to a locking pole 125, via fasteners 63 (FIG. 5), that extends through the respective end beams 26, 35 of the main frame structure 20 and the second frame structure 30 to lock the lifting mechanism 100 in its initial position and evidently the main frame structure 20 and the second frame structure 30 together. The locking bar 120 works in conjunction with the locking pole 125 to lift the second frame structure 30 and the locking bar 120 and the locking pole 125 are connected together via a fastener 64. The locking bar 120 and the locking pole 125 are further connected together by a lock bar spring 128 to bias the locking bar 120 towards the locking pole 125, i.e., an upward direction. The lock bar spring 128 has sufficient tension to pull the locking bar 120 towards the locking pole 125 during the unlocking stage, and conversely, sufficient tension to enable the locking bar 120 to return to its initial position during the locking stage.

Figure 5:
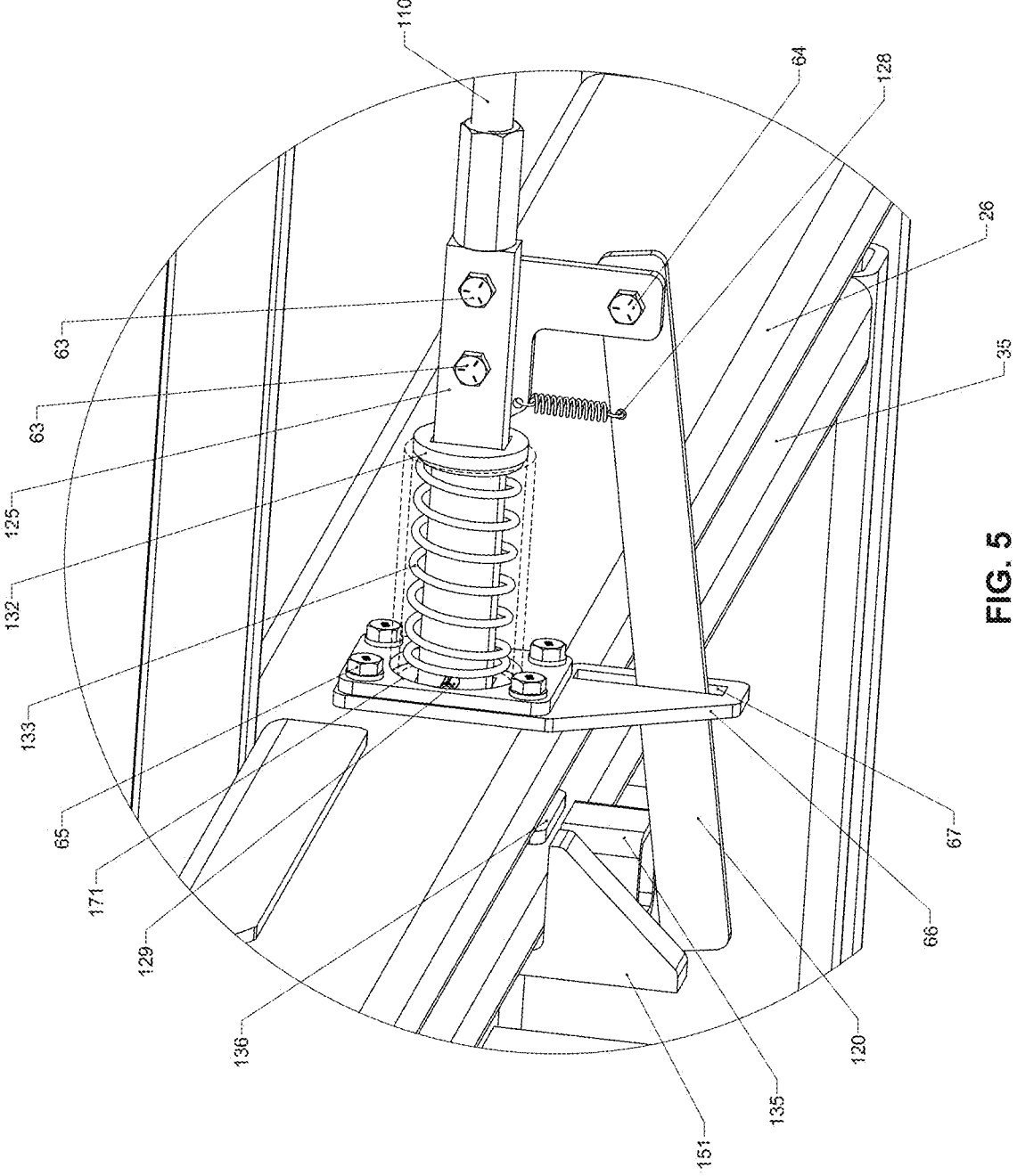
FIG. 5 is a perspective view of a locking bar and a locking pole in a locked state, according to an example embodiment.
Figure 6:
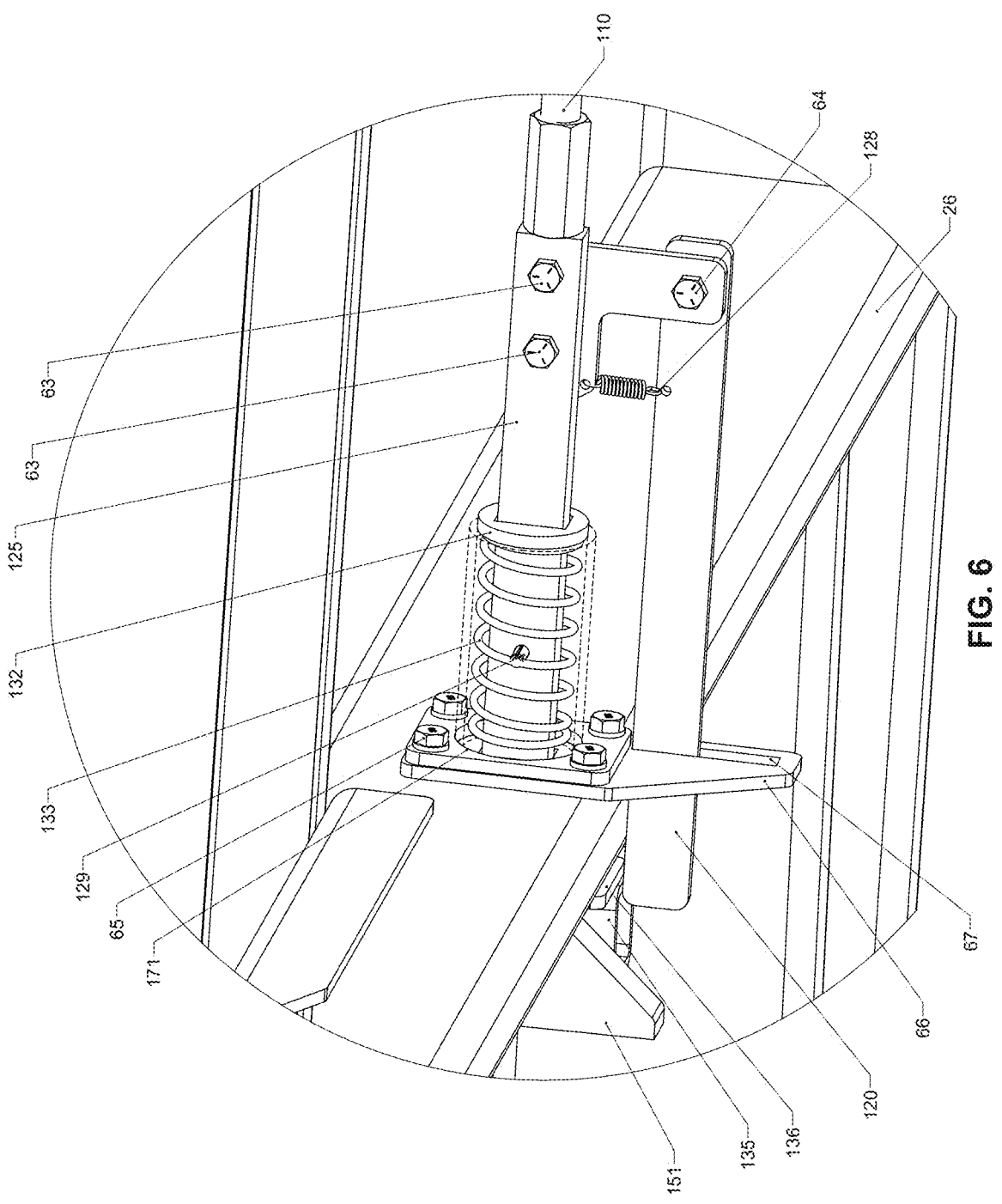
FIG. 6 is a perspective view of a locking bar and a locking pole in an unlocked state, according to an example embodiment.

Referring to FIGS. 5 and 6, the locking pole 125 extends into a spring cylinder 132 containing a spring 133 inside thereof, which is configured to move in a compressed state and an uncompressed state. It is appreciated that the spring 133 is a conventional spring known in the art that produces the appropriate force for lifting a lift trailer. Other devices may be employed, such as, for example, gas cylinder springs, hydraulic springs, and the like. As shown in at least FIGS. 5-8, near one end of the locking pole 125, the spring cylinder 132 is attached to end beam 26 via fasteners 65. The locking pole 125 extends through the respective openings 71, 73 of the end beam 26 and end beam 35. The locking pole 125 is designed such that it can be retracted (released) to a position to allow the tilting second frame structure 30 to be lowered or in its initial position. During the return of the second frame structure 30 back to its initial position (locking stage), the locking pole 125 works in conjunction with a wedge 151 in the second frame structure 30 to push back the locking pole 125 and eventually allow the second frame structure 30 to close completely and spring back the locking pole 125 into the lock position.

As shown, the locking pole 125 includes a roll pin 129 that transfers the spring 133 pressure to the locking pole 125. The roll pin 125 engages with the spring 133 and pulls an edge portion of the spring 133 back, providing the spring 133 in a compressed state. To describe differently, in the locked state of the lifting mechanism 100, the roll pin 129 is positioned near end beam 26 and no engagement with the spring 133 (FIG. 5). Conversely, in the unlocked state, the roll pin 125 moves away from end beam 26 and engages with the spring 133 and pushes the spring 133 into a compressed state (FIG. 6).

The locking bar 120 is configured to move towards the locking pole 125 and rests against a portion of the main frame structure 20 and/or the second frame structure 30. As shown in at least FIGS. 5-8, the locking bar 120 extends through a slot 67 of an extension member 66. The slot 67 restricts the upper/lower limit movements of the locking bar 120, in addition to providing support and stability to the locking bar 120 when moving in the upward and downward directions. A distal end of the locking bar 120 is configured to cooperatively engage with a protruding member 135 constructed on the end beam 35 of the tilting second frame structure 30. The protruding member 135 extends beyond the lowest portion of the second frame structure 30 so that the locking bar 120 adequately contacts the second frame structure 30. When the locking pole 125 is in its unlocked state, the locking bar 120 will rise or move upwards and apply an upward force on the protruding member 135 (due to the tension force of the lock bar spring 128) and force the second frame structure 30 to move concurrently upwards. Conversely, when an equipment is loaded onto the trailer 10, i.e., a load applied on the second main frame structure 30, the load of the equipment will force the second frame structure 30 to move downward and force the locking pole 125 to retract and return the locking bar 120 to its initial position (FIG. 5). Accordingly, because of gravity the present trailer 10 requires no power equipment or machinery to return the tilting deck trailer to its initial position from a loading position, providing an automated system.

In some implementations, in its raised position, the locking bar 120 rests against a tab member 136 built on the end beam 26 of the main frame structure 20. As shown, the tab member 136 extends slightly beyond the end beam 26. The tab member 136 prevents and/or reduces damage to the end beam 26 caused by the repetitive engagement of the locking bar 120 against the end beam 26.

Figure 4A:
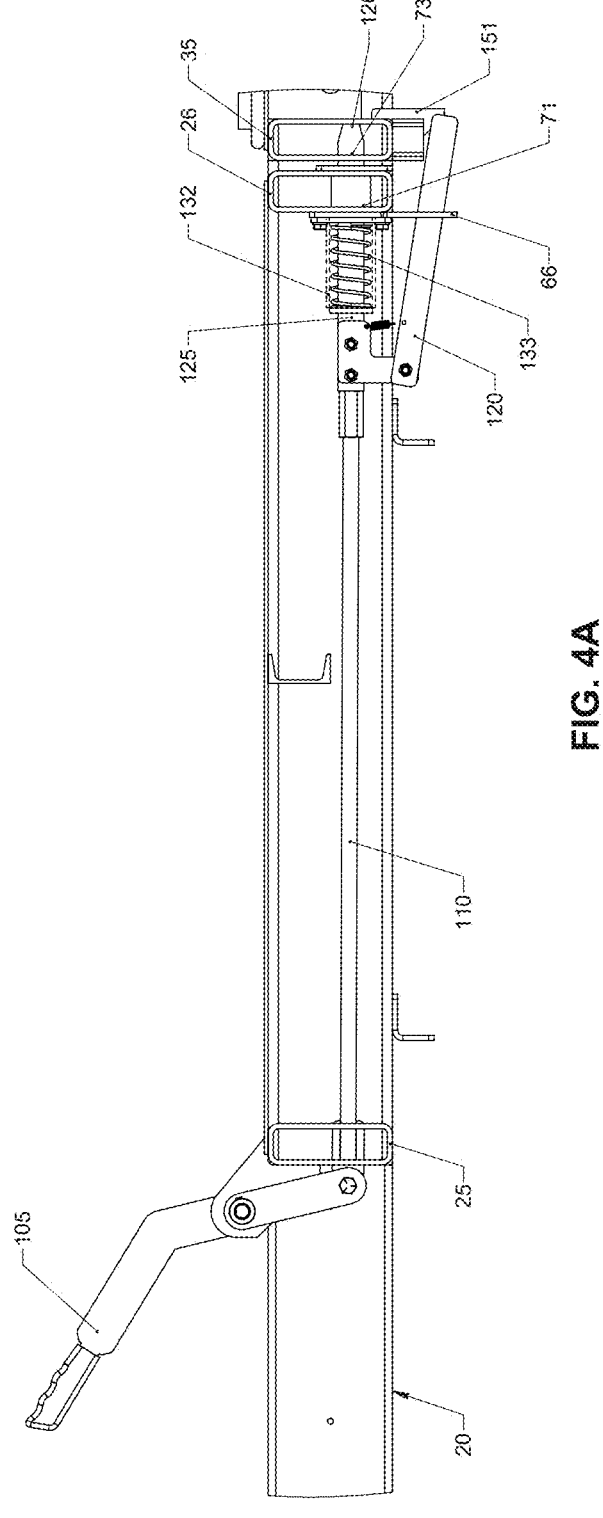
FIGS. 4A-4G are side perspective views of operation of a lifting mechanism, according to an example embodiment.
Figure 4B:
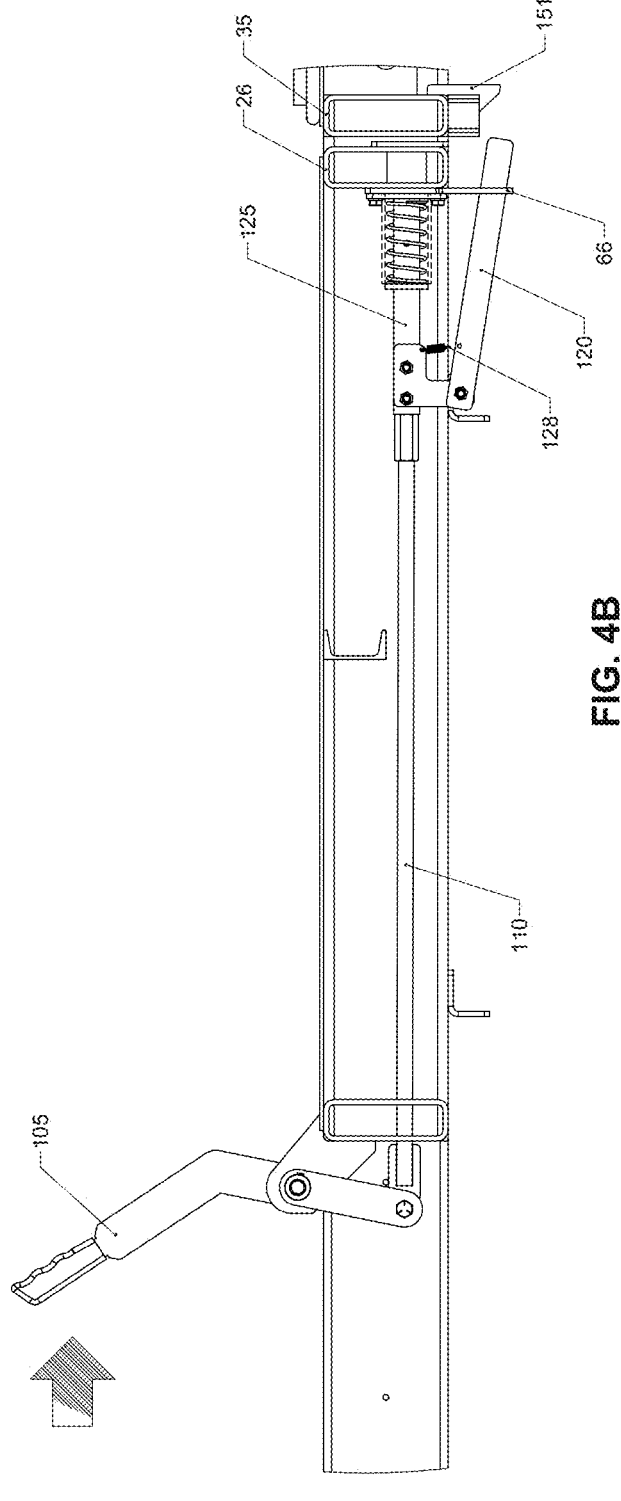
Figure 4C:
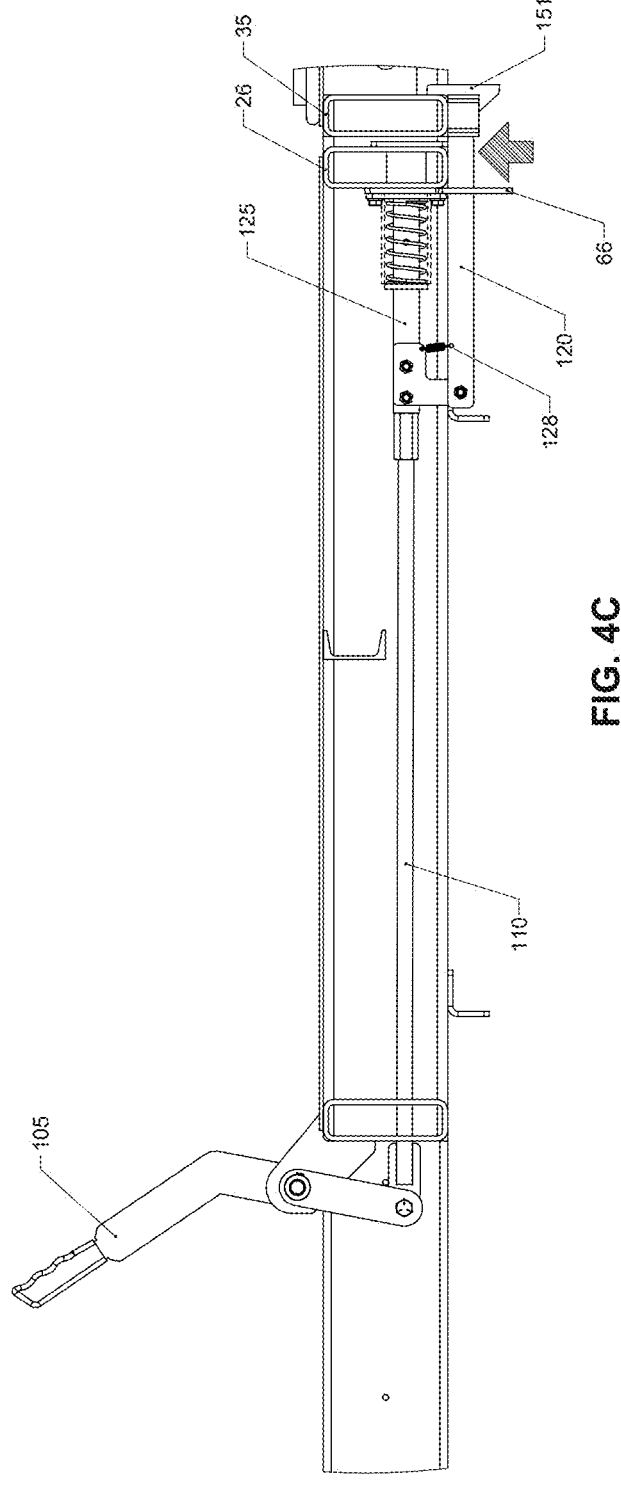
Figure 4D:
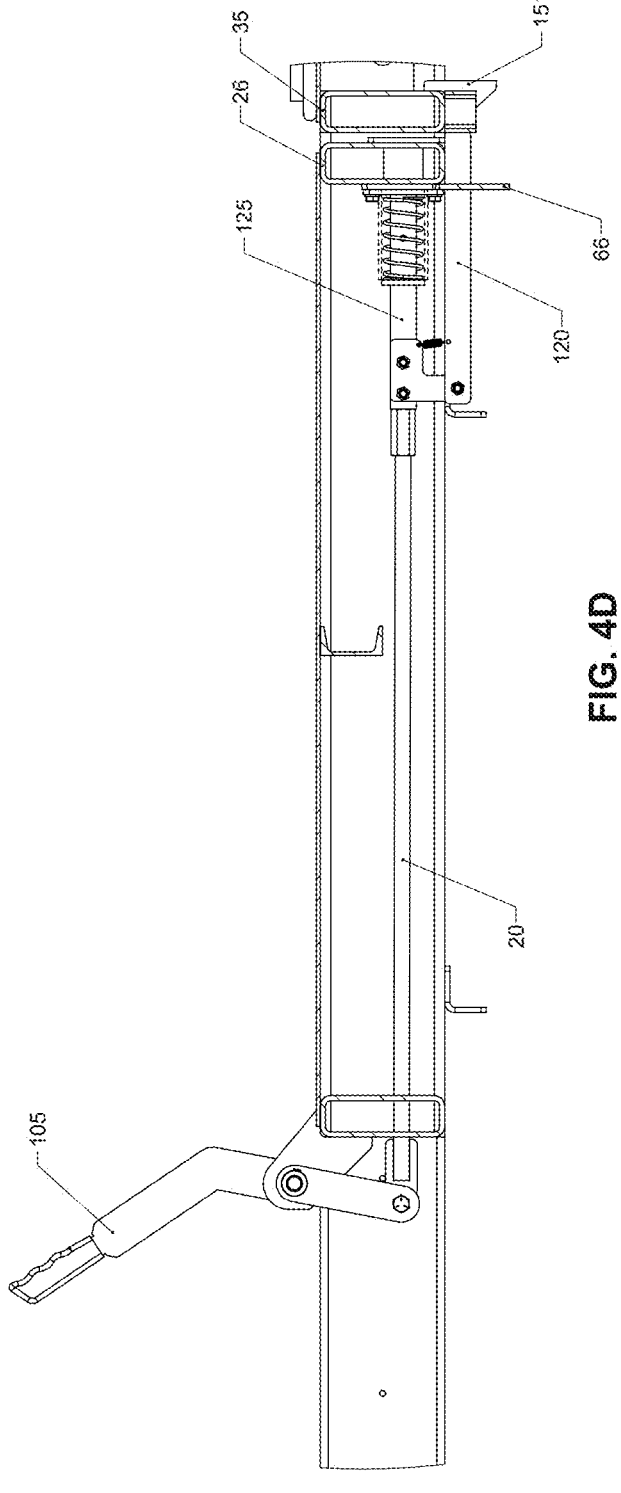
Figure 4E:
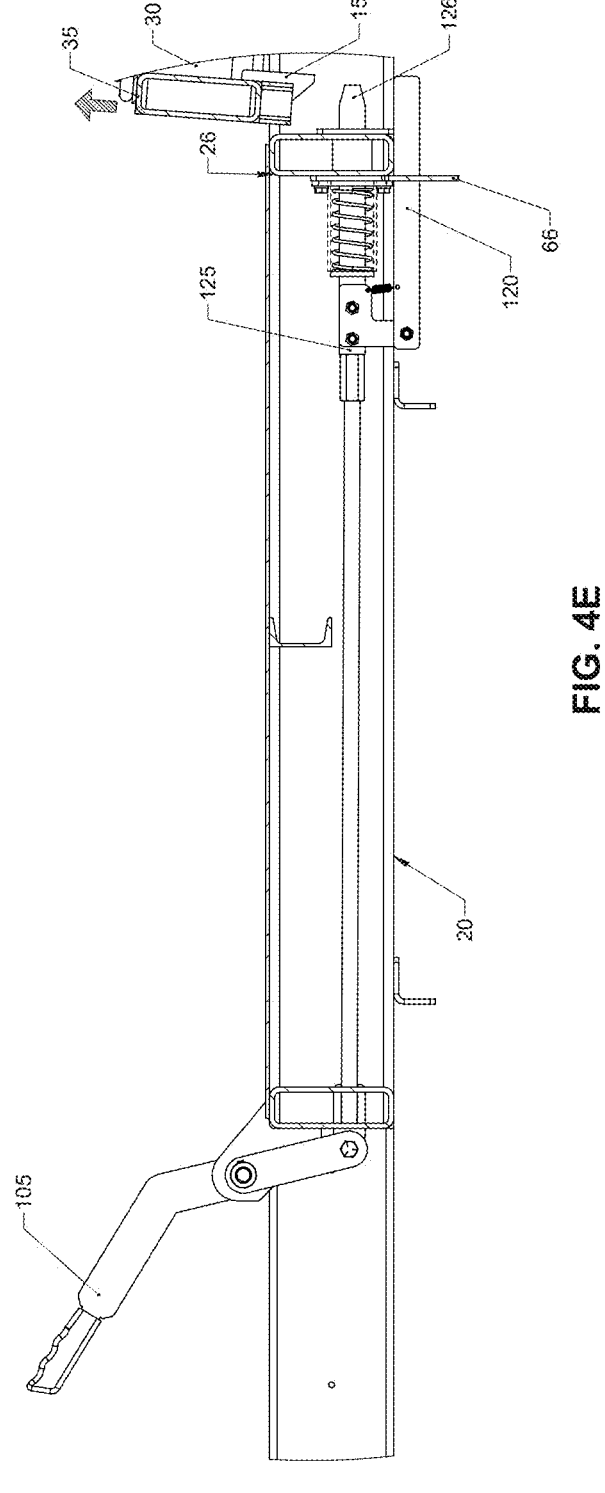
Figure 4F:
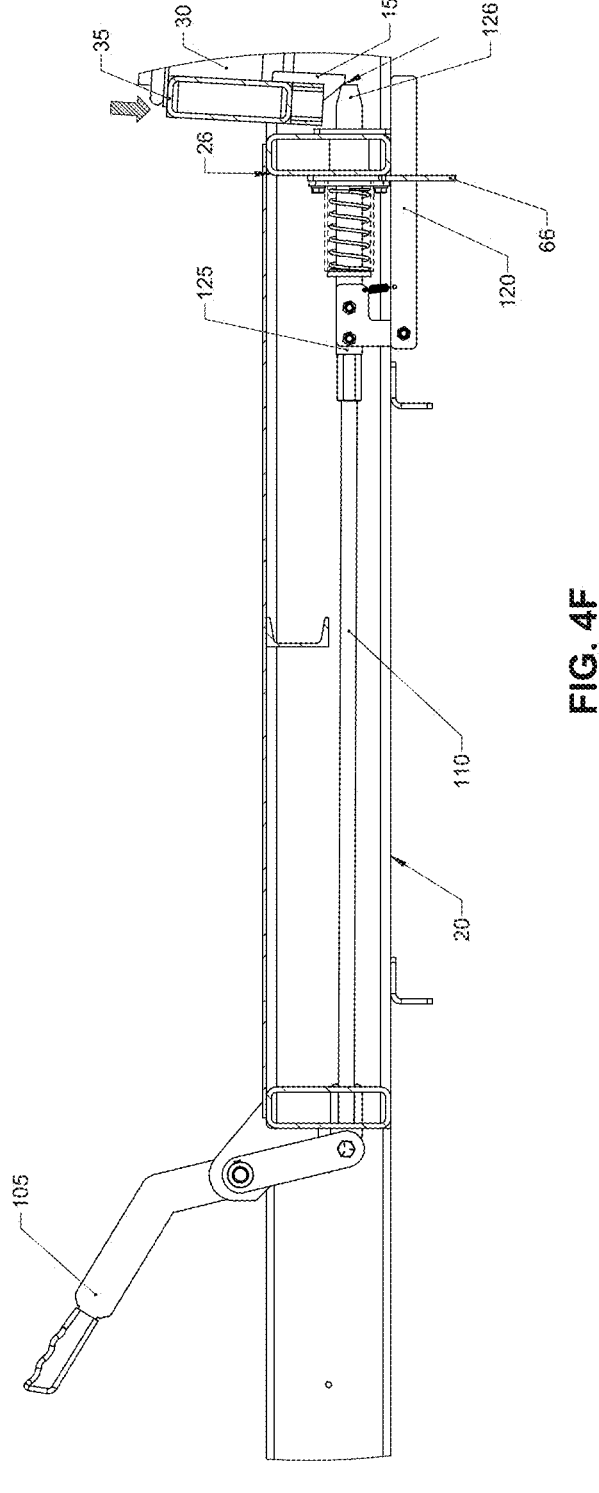
Figure 4G:
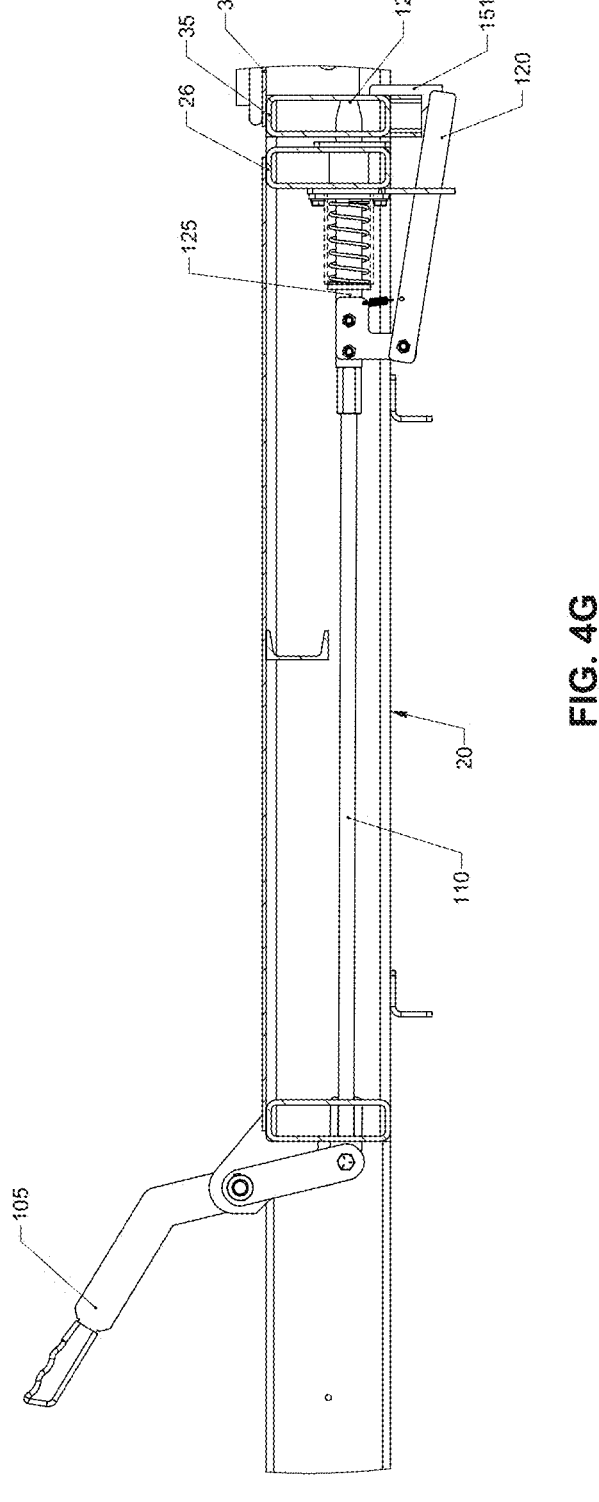

In use, referring to FIGS. 4A-4G, the user operates the lifting mechanism 100 by initially pushing the handle 105 towards a rear-end of the trailer (FIG. 4B) from its initial position (FIG. 4A). The handle 105 forces the locking bar 120 to move towards the locking pole 125 until the locking bar 120 rests against the main frame structure 20 or the tab member 136 (FIG. 4C). In one implementation, the locking bar 120 engages with the protruding member 135 and forces the second frame structure 30 to move upwards. This operation also forces the locking pole 125 to an unlocked state caused by the compressed spring 133 and holds the locking pole 125 in place until a load is applied on the trailer (FIG. 4D). As shown, the second frame structure 30 begins to tilt (i.e., move upward) to a loading configuration (FIG. 4E). To describe differently, the locking pole 125 is released to allow the second frame structure 30 to separate (or move away) from the main frame structure 20 until a lower rear end portion of the trailer 10 contacts a ground or a surface. Then, when an equipment is loaded on the trailer 10, the load forces the second frame structure 30 to move downward, which causes the locking pole 125 to engage with the wedge 151 and pushes the locking pole 125 away from the second frame structure 30 (FIG. 4F) until the second frame structure 30 returns to its initial position. At the same time, the protruding member 135 pushes the locking bar 120 downward and returns to its initial position (FIG. 4G). In other words, the locking pole 125 will be pushed back far enough to allow the second frame structure 30 to close completely, but not far enough to allow the locking bar 120 to spring up (as shown in FIG. 4C). The second frame structure 30 will push the locking bar 120 downward and the locking pole 125 will spring back into the locked position, locking the second frame structure 30 in place, providing an automated system.

Figures 8, 9, 10:
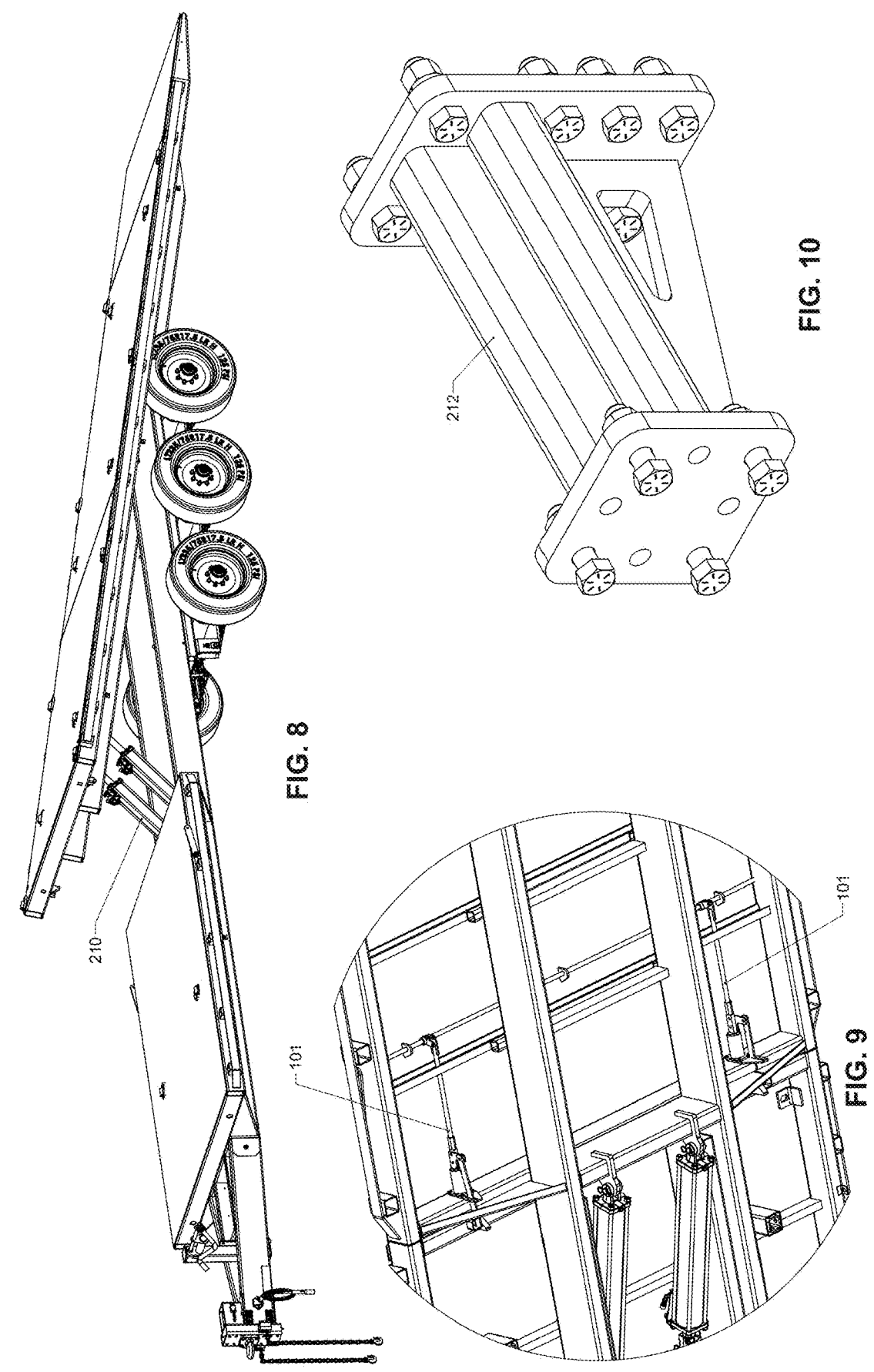
FIG. 8 is a perspective view of a trailer with a hydraulic system, according to an example embodiment.
FIG. 9 is a perspective view of a trailer with more than one lifting mechanism, according to an example embodiment.
FIG. 10 is a perspective view of a hitch extender, according to an example embodiment.

In some implementations, as shown in FIG. 8, the trailer 10 can include a hydraulic equipment 210 to handle larger loads. The hydraulic equipment 210 can be gravity tilt or powered tilt. The hydraulic equipment 210 can be kit as an add-on or built into the trailer 10. In other implementations, as shown in FIG. 9, the trailer 10 can include more than one lifting mechanism 101 to handle larger loads.

In some implementations, as shown in FIG. 10, the trailer 10 can include a hitch extender 212 to increase the distance between the vehicle and the trailer 10, typically, to avoid hitting an obstruction like a vehicle's tailgate when the trailer is fully loaded, or to provide additional clearance for turning maneuvers with a large trailer. As shown, the hitch extender 212 is sixteen inches long with an 8-bolt configuration. It should be appreciated that this is merely an example embodiment and other lengths and configurations can be employed.

Figures 11, 12:
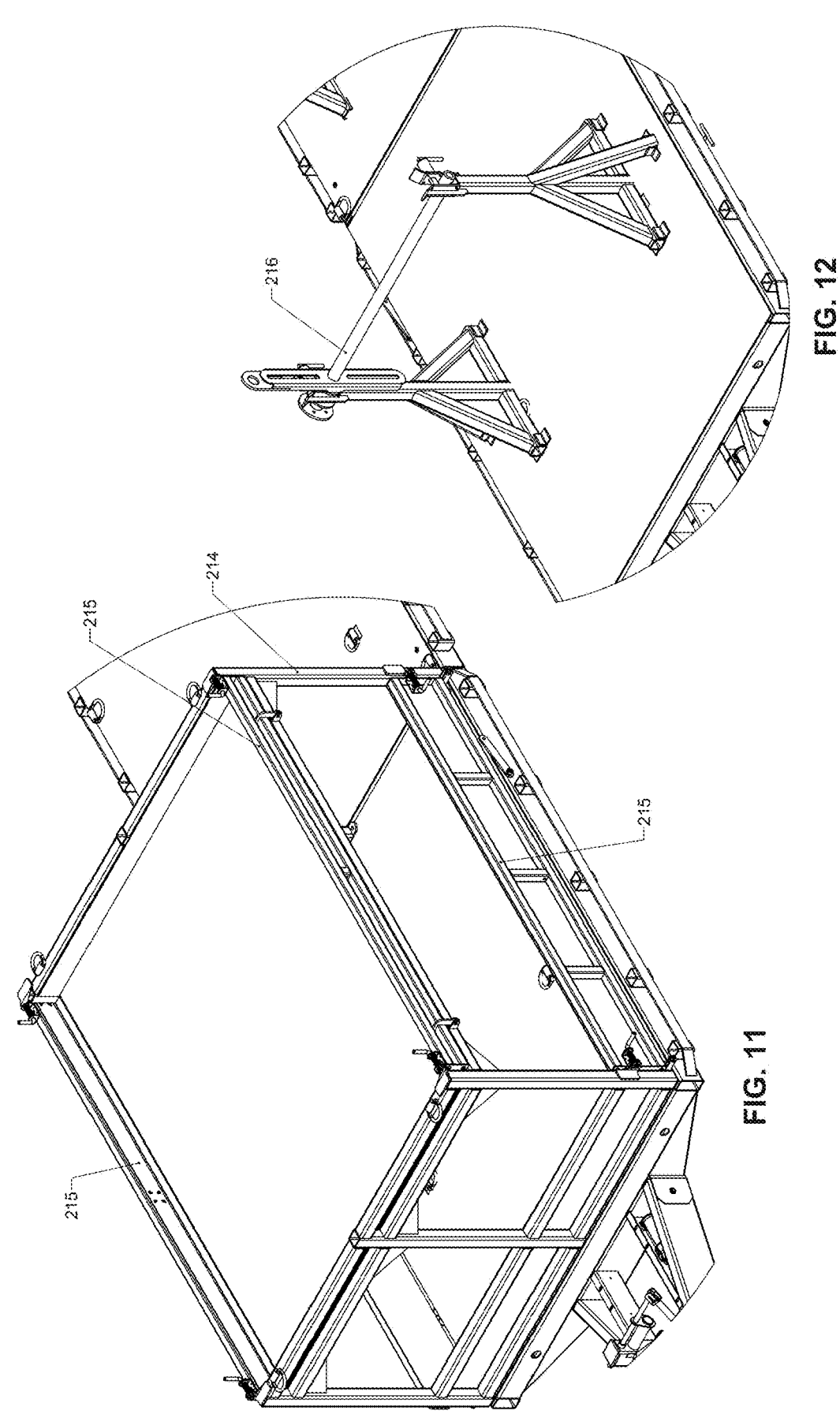
FIG. 11 is a perspective view of a trailer with a rack, according to an example embodiment.
FIG. 12 is a perspective view of a trailer with a reel stand, according to an example embodiment.

In some implementations, as shown in FIG. 11, the trailer 10 can include a rack 214 for additional equipment loading. The rack 214 can be the same size as the main frame structure 20. The rack 214 can have gates 215 that can open or flip on its side for ease of loading and unloading.

In some implementations, as shown in FIG. 12, the trailer 10 can include a reel stand 216. The reel stand 216 can be built in with the trailer 10 or can be removeable.

The aspects and embodiments of the present disclosure can be used alone or in combinations with each other.

The articles "a" and "an," as used herein, mean one or more when applied to any feature in embodiments of the present disclosure described in the specification and claims.

The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity.

"At least one," as used herein, means one or more and thus includes individual components as well as mixtures/combinations.

The transitional terms "comprising", "consisting essentially of" and "consisting of", when used in the appended claims, in original and amended form, define the claim scope with respect to what unrecited additional claim elements or steps, if any, are excluded from the scope of the claim(s). The term "comprising" is intended to be inclusive or open-ended and does not exclude any additional, unrecited element, method, step or material. The term "consisting of" excludes any element, step or material other than those specified in the claim and, in the latter instance, impurities ordinarily associated with the specified material(s). The term "consisting essentially of" limits the scope of a claim to the specified elements, steps or material(s) and those that do not materially affect the basic and novel characteristic(s) of the claimed disclosure. All materials and methods described herein that embody the present disclosure can, in alternate embodiments, be more specifically defined by any of the transitional terms "comprising," "consisting essentially of," and "consisting of."

Although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that, if an element is referred to as being "connected" or "coupled" to another element, it can be directly connected, or coupled, to the other element or intervening elements may be present. In contrast, if an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Spatially relative terms (e.g., "beneath," "below," "lower," "above," "upper" and the like) may be used herein for ease of description to describe one element or a relationship between a feature and another element or feature as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, for example, the term "below" can encompass both an orientation that is above, as well as, below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A tilt-deck trailer, comprising:
a main frame structure including a first end beam and a second end beam, the first end beam being closest to a vehicle and the second end beam being farthest from the vehicle, the main frame structure configured to remain stationary;
a second frame structure including a first end beam and a second end beam, the first end beam of the second frame structure being closest to the vehicle and the second end beam of the second frame structure being farthest from the vehicle, the second frame structure configured to move with respect to the main frame structure; and
a lifting mechanism attached to the main frame structure and configured to move the second frame structure into an upward-inclined loading position,
wherein one end of the lifting mechanism is disposed near the first end beam of the main frame structure and another end of the lifting mechanism is disposed near the second end beam of the main frame structure,
wherein, in a locked state, the lifting mechanism extends through the second end beam of the main frame structure and the first end beam of the second frame structure, and
wherein, in an unlocked state, the lifting mechanism extends through the second end beam of the main frame structure, releasing the second frame structure to move upwards.

2. The trailer of claim 1, wherein the lifting mechanism further comprises a control bar, a locking bar, a locking pole, and a handle.

3. The trailer of claim 2, wherein the control bar is connected to the handle at one end and the locking pole at the other end, wherein the handle operates the locking pole to lock/unlock the lifting mechanism.

4. The trailer of claim 3, wherein the locking bar operates in conjunction with the locking pole to raise and lower the second frame structure.

5. The trailer of claim 4, wherein a lock spring connects the locking bar and the locking pole to provide a biasing force toward each other.

6. The trailer of claim 4, wherein the locking bar is positioned below the locking pole, wherein, in the locked state, the locking bar is in a lowered position, and in the unlocked state, the locking bar is in a raised position.

7. The trailer of claim 6, wherein the locking bar extends through a slot formed on an extension member.

8. The trailer of claim 3, wherein the locking pole extends through a spring cylinder containing a spring therein, wherein the spring compresses to release the locking pole and move the second frame structure upwards.

9. The trailer of claim 8, wherein the locking pole includes a roll pin to engage and compress the spring so as to release or unrelease the locking pole.

10. The trailer of claim 3, wherein the locking bar engages with a protruding member to raise or lower the second frame structure.

11. The trailer of claim 10, wherein the protruding member is located on the first end beam of the second frame structure.

12. The trailer of claim 3, wherein the locking pole engages with a wedge for lowering the second frame structure.

13. The trailer of claim 12, wherein the wedge is located on the first end beam of the second frame structure.

14. A method of using the trailer of claim 1, the method comprising:
pushing a handle towards a rear-end of the trailer;
moving a locking bar towards the main frame structure;
unlocking a locking pole that was inserted through the main frame structure and the second frame structure;
raising the second frame structure;
lowering the second frame structure when a load is applied;
pushing back the locking pole to allow the second frame structure to be lowered; and
relocking the locking pole, via a spring, when the second frame structure is completely lowered.

15. A trailer, comprising:
an elongate stationary deck including a main frame structure;
an elongate tilt deck including a second frame structure, the elongate tilt deck being configured to tilt relative to the elongate stationary deck; and
a lifting mechanism disposed below and extending in a longitudinal direction of the elongate stationary deck,
wherein the lifting mechanism is configured to be in a first position to lock the elongate tilt deck in place and to be in a second position to unlock the elongate tilt deck and tilt the elongate tilt deck for loading, and
wherein the lifting mechanism is operated by gravity.

16. The trailer of claim 15, wherein the lifting mechanism extends through the main frame structure and the second frame structure to lock the second frame structure.

17. The trailer of claim 15, wherein the lifting mechanism extends through only the main frame structure to release the second frame structure.

18. The trailer of claim 15, wherein the lifting mechanism includes at least a locking bar and a locking pole, wherein the locking bar operates in conjunction with the locking pole to raise and lower the second frame structure.

19. The trailer of claim 18, wherein the locking bar engages with a protruding member, located on the second frame structure, to raise or lower the elongate tilt deck.

20. The trailer of claim 18, wherein the locking pole engages with a wedge, located on the second frame structure, to lower the elongate tilt deck.

\* \* \* \* \*